United States Patent
Tsumagari

(10) Patent No.: US 7,572,637 B2
(45) Date of Patent: Aug. 11, 2009

(54) METHOD FOR CONTROLLING EXHAUST EMISSION CONTROL DEVICE

(75) Inventor: Ichiro Tsumagari, Hino (JP)

(73) Assignee: Hino Motors, Ltd., Hino-shi (JP)

( * ) Notice: Subject to any disclaimer, the term of this patent is extended or adjusted under 35 U.S.C. 154(b) by 189 days.

(21) Appl. No.: 11/573,067

(22) PCT Filed: Aug. 8, 2005

(86) PCT No.: PCT/JP2005/014499

§ 371 (c)(1),
(2), (4) Date: Feb. 1, 2007

(87) PCT Pub. No.: WO2006/016543

PCT Pub. Date: Feb. 16, 2006

(65) Prior Publication Data

US 2007/0217984 A1    Sep. 20, 2007

(30) Foreign Application Priority Data

Aug. 9, 2004   (JP) .............................. 2004-232164

(51) Int. Cl.
   *B01D 53/86*   (2006.01)
(52) U.S. Cl. ...................... 436/37; 423/235; 423/239.1; 436/159; 436/155
(58) Field of Classification Search ................. 436/127; 60/274, 286
   See application file for complete search history.

(56) References Cited

U.S. PATENT DOCUMENTS 5,950,422 A    9/1999 Dolling

| | | | |
|---|---|---|---|
| 6,755,014 B2 * | 6/2004 | Kawai et al. ................... | 60/286 |
| 2003/0041594 A1 | 3/2003 | Van Nieuwstadt | |

FOREIGN PATENT DOCUMENTS

| DE | 43 10 961 C1 | 3/1994 |
|---|---|---|
| DE | 103 01 606 A1 | 7/2004 |
| JP | 07 083073 | 3/1995 |
| JP | 7 509551 | 10/1995 |
| JP | 11 512799 | 11/1999 |
| JP | 2002 161732 | 6/2002 |
| JP | 2002 213286 | 7/2002 |
| WO | WO 97/12129 | 4/1997 |
| WO | WO 2004/109072 A1 | 12/2004 |

* cited by examiner

*Primary Examiner*—Walter D Griffin
*Assistant Examiner*—Christine T Mui
(74) *Attorney, Agent, or Firm*—Oblon, Spivak, McClelland, Maier & Neustadt, P.C.

(57) ABSTRACT

Urea water is added to a catalyst in an exhaust pipe for purification. A first-order lag response model corresponding to the exhaust temperature upstream of the catalyst estimates catalyst temperature for each of divided cells of the catalyst. Cell volumes for each of temperature zones are summed on the basis of the estimated temperatures for the cells. The summation for each temperature zone is divided by the whole catalyst volume to determine temperature distribution volume ratio. The ratio for each of the temperature zones is multiplied by a reference injection amount of the urea water determined in consideration to a current engine operation status on the assumption that the catalyst temperatures are all within the temperature zone. The calculated values for the respective temperature zone are summed into a directive injection amount of the urea water.

2 Claims, 3 Drawing Sheets

METHOD FOR CONTROLLING EXHAUST EMISSION CONTROL DEVICE

TECHNICAL FIELD

The present invention relates to a method for controlling an exhaust emission control device for reduction and purification of $NO_x$ in exhaust gas.

BACKGROUND ART

Conventionally, some diesel engines have selective reduction catalyst incorporated in an exhaust pipe through which exhaust gas flows, said catalyst having a feature of selectively reacting $NO_x$ with a reducing agent even in the presence of oxygen; a required amount of reducing agent is added upstream of the catalyst to be reacted with $NO_x$ (nitrogen oxides) in exhaust gas on the catalyst to thereby reduce a concentration of the discharged $NO_x$.

Meanwhile, effectiveness of ammonia ($NH_3$) used as a reducing agent for reduction and purification of $NO_x$ is well known in a field of industrial flue gas denitration, for example, in a plant. However in a field of automobile where safety is hard to assure as to running with ammonia itself being loaded, researches have been made nowadays on use of nontoxic urea water as the reducing agent (see, for example, Reference 1).

[Reference 1] JP 2002-161732A

More specifically addition of the urea water to the exhaust gas upstream of the selective reduction catalyst under a temperature condition of about 170-180° C. or more causes the urea water to be decomposed into ammonia and carbon monoxide, and $NO_x$ in the exhaust gas or the catalyst is satisfactorily reduced and purified by ammonia.

In such exhaust emission control device, it is important to properly and adequately control an injection amount of the urea water to keep the $NO_x$ reduction ratio as high as possible. However, reaction rate of $NO_x$ reduction on the catalyst greatly depends upon temperatures of the catalyst, so that it necessary to correct a basic injection amount determined on the basis of a current engine operation status so as to be consistent with the reaction rate by using entry or exit temperature of the catalyst as substitution for the catalyst temperatures.

SUMMARY OF THE INVENTION

Problems to be Solved by the Invention

However, when the entry temperature of the catalyst is used for the control, there is a possibility that an actual catalyst temperatures do not reach the detection temperature yet; when the exit temperature of the catalyst is used for the control, there is a possibility that the actual catalyst temperatures are already beyond the detection temperature. Thus, there is a fear that the control in injection amount of the urea water may be too early or too late to adequately bring out the $NO_x$ reduction performance.

The invention was made in view of the above and has its object to provide a method for controlling an exhaust emission control device which makes it possible to properly and adequately control an injection amount of a reducing agent such as urea water so as to keep $NO_x$ reduction ratio as high as possible.

Means or Measures for Solving the Problems

The invention is directed to a method for controlling an exhaust emission control device with selective reduction catalyst incorporated in an exhaust pipe, a reducing agent being added upstream of the catalyst by reducing agent addition means so as to reduce and purify NO, which comprises the steps of detecting an exhaust temperature upstream of the catalyst, using a first-order lag response model corresponding to the detected temperature to estimate a temperature of each of cells into which the catalyst is minutely divided summing up cell volumes for each of temperature zones on the basis of the estimated temperatures for the cells, dividing the cell volume summation for each of the temperature zones by a whole volume of the catalyst to determine temperature distribution volume ratio for said temperature zone, multiplying the determined temperature distribution volume ratio for each of the temperature zones by a reference injection amount of the reducing agent which is determined for said temperature zone in consideration of a current engine operation status on the assumption that catalyst temperatures are all within said temperature zone, and summing up the calculated values for the temperature zones into a directive injection amount of the reducing agent to the reducing agent addition means.

More specifically temperatures of the catalyst incorporated in the exhaust pipe vary following the temperature of the exhaust gas from the engine, so that, to the exhaust temperature upstream of the catalyst as input, temperature variation response of the catalyst can be expressed as first-order lag response model by equation. However, it is to be considered that the catalyst temperatures cannot be represented as uniform and that there is temperature distribution in the flow of the exhaust gas.

Thus, the first-order lag response model is used to estimate temperatures of sectional points of the catalyst. The estimated temperatures for the sectional points are, for example, properly interpolated to be allocated to a plurality of cells into which the catalyst is minutely divided so that the catalyst temperature is estimated for each of the cells. Then, on the basis of the estimated temperature for each of the cell, cell volumes are summed up for each of temperature zones; the cell volume summation for each of the temperature zones is divided by a whole volume of the catalyst to thereby determine temperature distribution volume ratio for the temperature zone.

In utilization of the thus determined temperature distribution volume ratio, the temperature distribution volume ratio for each of the temperature zones is multiplied by a reference injection amount of the reducing agent which is determined for said temperature zone in consideration of a current engine operation status on the assumption that catalyst temperatures are all within said temperature zone. The calculated values for the respective temperature zones are summed up into a directive injection amount of the reducing agent to the reducing agent addition means. Thus, proper adequate injection of the reducing agent is attained in accordance with volume ratios of the respective temperature zones for the catalyst.

In the invention, upon estimation of catalyst temperature for each of the cells, it is preferable to effect temperature correction in consideration of endotherm in cooling action through addition of the reducing agent and exotherm due to $NO_x$ purification reaction. Thus, estimation of catalyst temperature can be effected with higher accuracy for each of the cells in consideration of endotherm in the cooling action through addition of the reducing agent and exotherm due to $NO_x$ purification reaction, and thus directive injection amount of the reducing agent can be more accurately controlled.

Effects of the Invention

According to the above-mentioned method for controlling an exhaust emission control device of the invention the following excellent effects and advantages can be obtained.

(I) Proper and adequate injection of the reducing agent can be realized in accordance with the volume ratios of the respective temperature zones for the catalyst. As a result $NO_x$ reduction performance of the catalyst can be maximumly brought out to keep the $NO_x$ reduction ratio as high as possible by properly controlling the injection amount of the reducing agent; an amount of consumption of the reducing agent required can be suppressed to minimum by preventing the reducing agent from being excessively injected; and it can be preliminarily prevented that any excessive reducing agent passes through the catalyst and is discharged while it remains unreacted.

(II) When the temperature correction is carried out in consideration of endotherm in the cooling action through addition of the reducing agent and exotherm due to the $NO_x$ purification reaction upon estimation of catalyst temperature for each of the cells the estimation can be made with higher accuracy in consideration of endotherm in the cooling action through addition of the reducing agent and exotherm due to $NO_x$ purification reaction and thus directive injection amount of the reducing agent can be controlled more accurately.

Figure 1:
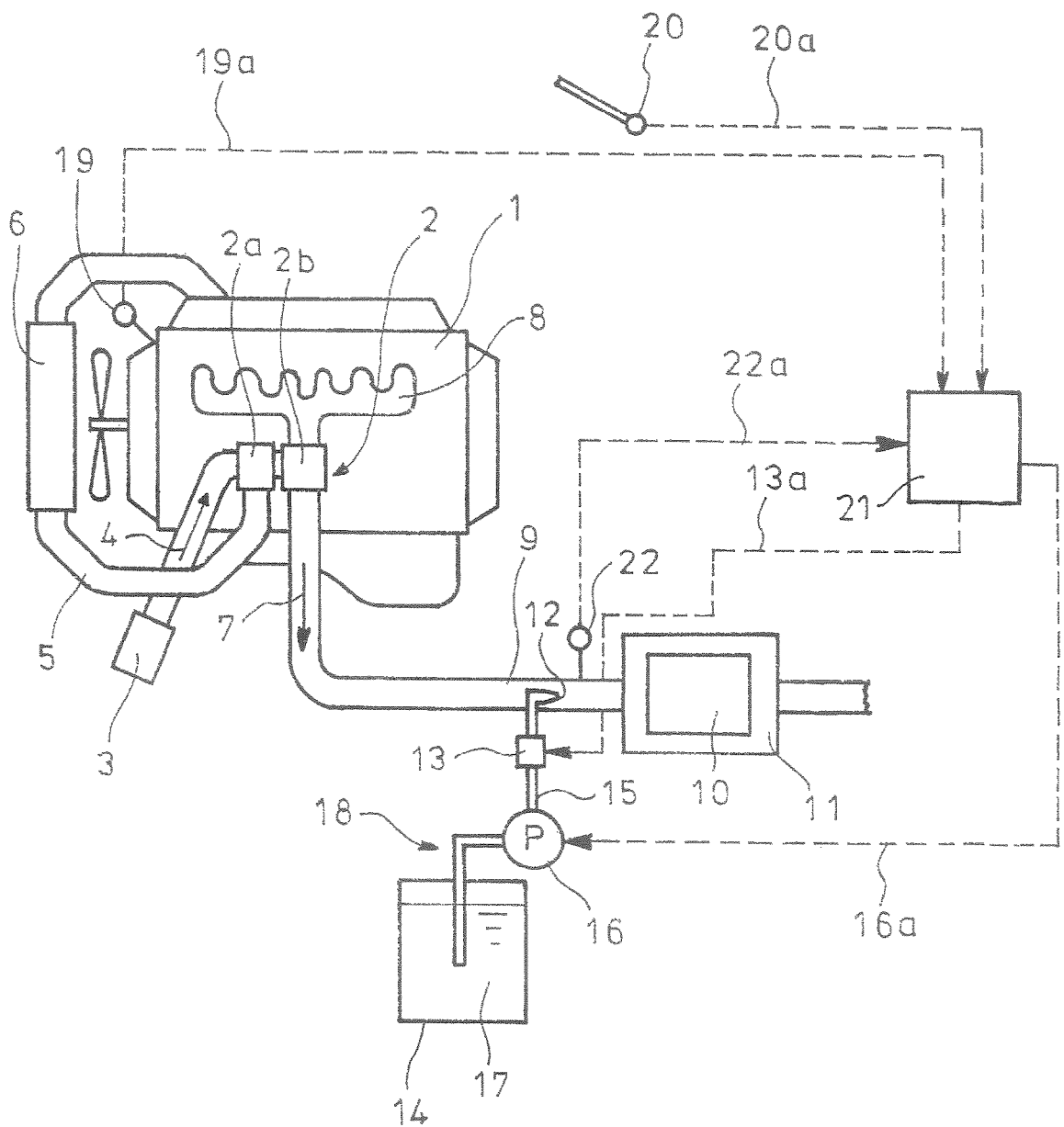
[FIG. 1] A schematic view showing an embodiment of the invention.

EXPLANATION OF THE REFERENCE NUMERALS 7 exhaust gas
9 exhaust pipe
10 selective reduction catalyst
17 urea water (reducing agent)
18 urea water addition means (reducing agent addition means)
21 control unit
22 temperature sensor
22a detection signal

BEST MODE FOR CARRYING OUT THE INVENTION

An embodiment of the invention will be described in conjunction with the drawings.

Figure 2:
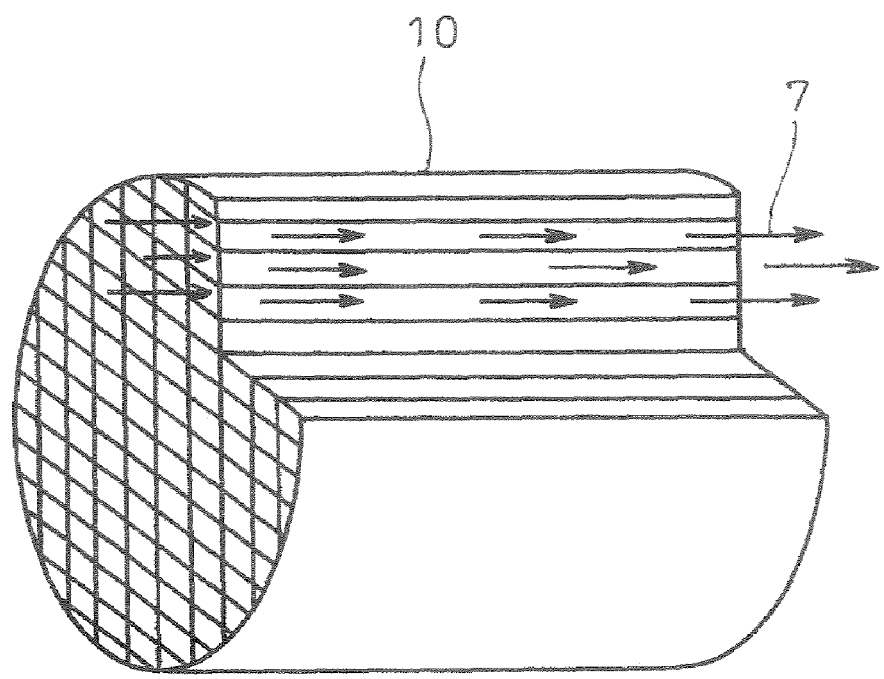
[FIG. 2] A partially cutaway view in perspective of the selective reduction catalyst shown in FIG. 1
Figure 3:
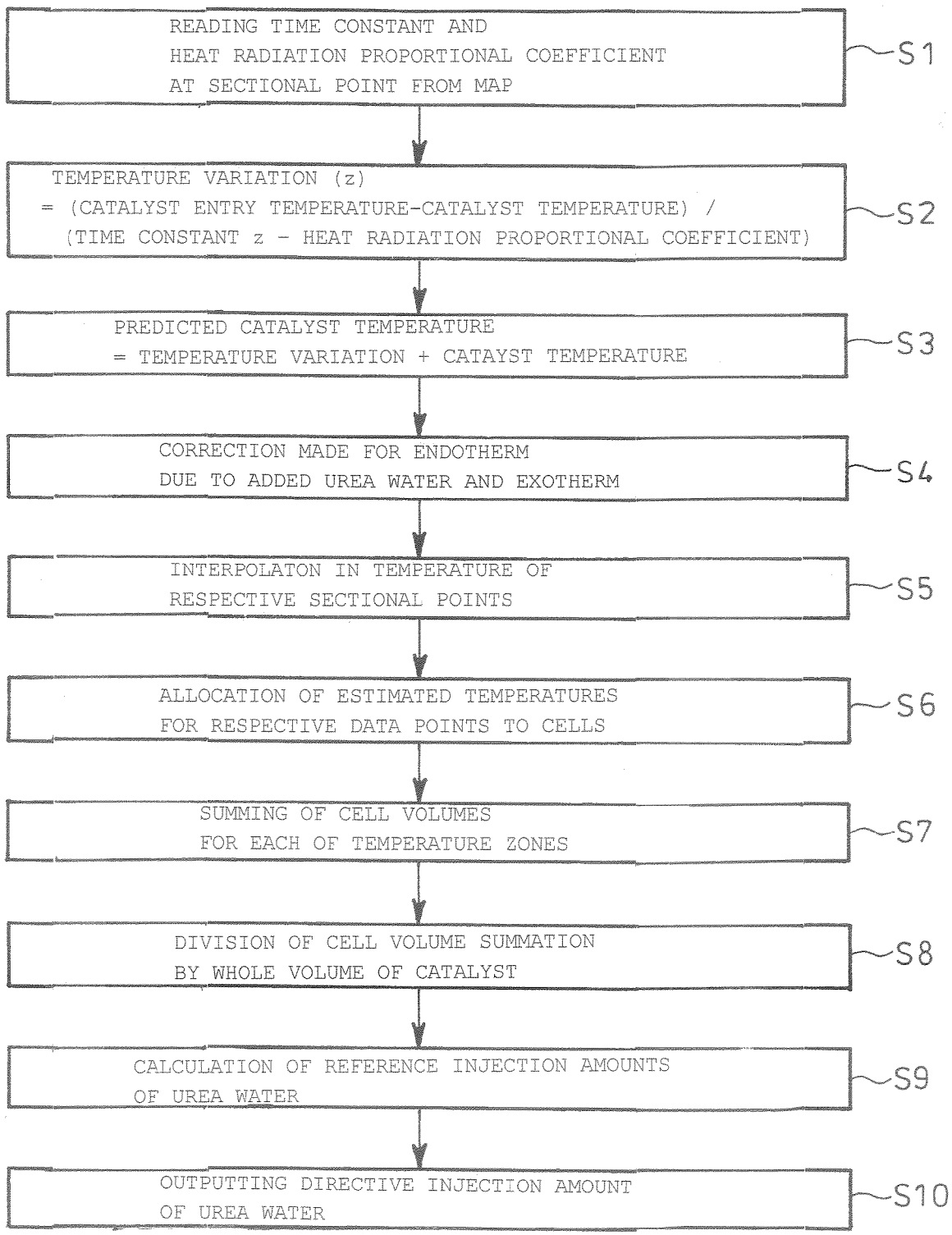
[FIG. 3] A flowchart showing specific control steps in the control unit shown in FIG. 1.

FIGS. 1-3 show the embodiment of the invention. In FIG. 1 reference numeral 1 denotes a diesel engine. The engine 1 illustrated has a turbocharger 2 with a compressor 2a to which air 4 from an air cleaner 3 is fed via an intake air pipe 5. The air 4 thus pressurized in the compressor 2a is further fed to an intercooler 6 where it is cooled. The cooled air 4 from the intercooler 6 is guided to an intake manifold (not shown) to be introduced into each of cylinders in the engine 1.

Exhaust gas 7 discharged from each of the cylinders in the engine 1 is fed via an exhaust manifold 8 to a turbine 2b of the turbocharger 2. The exhaust gas 7 thus having driven the turbine 2b is discharged via an exhaust pipe 9 to outside of the vehicle.

Incorporated in the exhaust pipe 9 through which the exhaust gas 7 flows is selective reduction catalyst 10 carried by a casing 11. The catalyst 10 is formed as a flow-through type honeycomb structure as shown in FIG. 2 and has a feature of capable of selectively reacting $NO_x$ with ammonia even in the presence of oxygen.

Arranged upstream of the casing 11 is a urea water injection valve 13 with an injection nozzle 12. The injection valve 13 is connected through a urea water supply line 15 to a urea water tank 14 arranged in a required site. Actuation of a supply pump 16 incorporated in the supply line 15 causes urea water (reducing agent) 17 in the tank 14 to be added through the injection valve 13 and upstream of the catalyst 10. The injection valve 13, the tank 14, the supply line 15 and the supply pump 16 constitute urea water addition means (reducing agent addition means) 18.

In the engine 1, a revolution speed sensor 19 is arranged for detection of the revolution speed of the engine. A revolution speed signal 19a from the sensor 19 and a load signal 20a from an accelerator sensor 20 (sensor for detecting accelerator pedal stepped-in angle) are inputted to an electronic control unit (ECU) 21 in the form of an engine control computer.

Arranged on entry side of the casing 11 which carries the catalyst 10 is a temperature sensor 22 for detection of the exhaust temperature, a detection signal 22a from the sensor 22 being also inputted to the control unit 21. (The temperature sensor 22 may be alternatively arranged at, for example, an outlet of the exhaust manifold 8 to detect a temperature on an exit side of the engine.)

In the control unit 21, an amount of emission of $NO_x$ is estimated on the basis of a current operation status determined by the revolution speed and load signals 19a and 20a from the sensors 19 and 20, respectively. A basic injection amount of the urea water is calculated so as to be consistent with the estimated amount of emission of $NO_x$. The basic injection amount is corrected in terms of temperature as described in detail hereinafter on the basis of the detection signal 22a from the temperature sensor 22 to finally calculate a directive injection amount of the urea water 17. A directive for the directive injection amount of the urea water 17 is issued to the urea water addition means 18.

More specifically, valve-opening and actuation command signals 13a and 16a are outputted to the injection valve 13 and supply pump 16, respectively. The injection amount of the urea water 17 is properly controlled by valve-opening operation of the valve 13, and injection pressure required for such addition is obtained by actuation of the pump 16.

FIG. 3 shows specific control steps in the control unit 21. Adopted in steps S1-S3 is a technique which uses a first-order lag response model corresponding to the exhaust temperature on the entry side of the catalyst 10 to thereby estimate predicted catalyst temperatures at a plurality of sectional points of the catalyst 10.

More specifically the temperatures of the catalyst 10 incorporated in the exhaust pipe 9 vary following the temperature of the exhaust gas 7 from the engine 1, so that, to the exhaust temperature upstream of the catalyst 10 as input, temperature variation response of the catalyst 10 can be expressed as first-order lag response model by equation such as Equation 1 below (Though the model exemplified is for a discrete system, a model for a continuous system may be also applicable.)

temperature variation (z)=(catalyst entry temperature−catalyst temperature)/(time constant z−heat radiation proportional coefficient)   Equation 1

However, consideration has to be taken to the fact that the catalyst 10 is not of uniform temperature and has temperature distribution in the direction of flow of the exhaust gas 7. Thus, set to the catalyst 10 are a plurality of sectional points such as three points radially at an entry portion, two points radially at an intermediate portion and three points radially at an exit portion of the catalyst 10 so as to estimate predicted catalyst temperatures.

Here, the wording "catalyst entry temperature" refers to the detection temperature sensed by the temperature sensor 22; "catalyst temperature" refers to the previous estimated value; and "time constant" and "heat radiation proportional coefficient" are read from a map of measured value of the current temperature sensor 22 and of exhaust flow rate. First in step S1, for each of the plural sectional points set to the catalyst 10, the time cons ant and the heat radiation proportional coefficient is read from the map.

The exhaust flow rate required together with the measured value of the sensor 22 upon reading the time constant and heat radiation proportional coefficient for the respective sectional points from the map may be estimated on the basis of an air flow value and directive fuel amounts to respective cylinders grasped in the control unit 21 for engine control.

Then, in step S2, temperature variation for each of the sectional points is obtained by the first-order lag response model, using the time constant and heat radiation proportional coefficient obtained in previous step S1, the catalyst entry temperature known from the measured value of the current temperature sensor 22 and previous value of catalyst temperature stored in the control unit 21.

Further, in step S3, temperature variation in each of the sectional points obtained in step S2 is added to the previous, estimated value of catalyst temperature for each of the sectional points (which is same as that used in step S2) to thereby calculate the predicted catalyst temperature for each of the sectional points.

Then, in succeeding step S4, temperature correction is carried out mainly on the basis of the previous directive injection amount of the urea water 17 and in consideration of endotherm in cooling action through addition of the urea water 17 and exotherm due to $NO_x$ purification reaction.

More specifically, endothermic change occurs due to cooling action through adhesion of moisture in urea water 17 onto the catalyst 10; and exothermic change occurs due to reaction of ammonia generated from the urea water 17 with $NO_x$ in the exhaust gas on the catalyst 10. Thus, the correction is made for such endotherm and exotherm.

Then, the thus corrected predicted catalyst temperature for each of sectional points is interpolated (INTRPL) in succeeding step S5 using, for example, quadratic to thereby estimate temperatures for further sectionalized intermediate points of the catalyst 10.

Then, in succeeding step S6, estimated temperatures for many data points obtained in the previous step S5 are allocated to cells or minute divisions of the catalyst 10, so that catalyst temperature is estimated for each of the cells.

Then, in step S7, on the basis of the estimated temperatures for the cells, cell volumes are summed up for each of a plurality of temperature zones (temperature zones, for example, by about 10° C.) In succeeding step S8, the cell volume summation for each of the temperature zones is divided by the whole volume of the catalyst to thereby determine temperature distribution volume ratio. Thus, it is accurately grasped that, in the catalyst 10, a temperature zone of so-and-so degrees C. accounts for so-and-so percent.

Then, in step S9, a reference injection amount of the urea water 17 for each of the temperature zones is calculated or determined in consideration of operation status of the current engine 1 and on the assumption that catalyst temperatures are all within said temperature zone. In succeeding step S10, the calculated reference injection amount for each of the temperature zones is multiplied with the temperature distribution volume ratio for the temperature zone. The thus calculated values for the respective temperature zones are summed up and outputted as directive injection amount to the urea water addition means 18.

As to the reference injection amount of the urea water 17 calculated in the previous step S9, it is to be noted that the reference injection amount of the urea water 17 means an injection amount for each of the temperature zones obtained by correcting in terms of temperature a basic injection amount in consistent with the amount of emission of $NO_x$ estimated on the basis of a current operation status and in the assumption that catalyst temperatures are all within the temperature zone.

Thus, control of the exhaust emission control device by such control unit 21 makes it possible to detect exhaust temperature at the entry to the catalyst 10 and use a first-order lag response model corresponding to the detected temperature to estimate catalyst temperature for each of cells into which the catalyst 10 is minutely divided, and further makes it possible to sum up cell volumes for each of temperature zones on the basis of the estimated temperatures for the respective cells and to divide the cell volume summation for each of the temperature zones by a whole volume of the catalyst to determine temperature distribution volume ratio.

Further, in utilization of the thus obtained temperature distribution volume ratio, the temperature distribution volume ratio for each of the temperature zones is multiplied by a reference injection amount of the urea water 17 for the temperature zone, the calculated values for the respective temperature zones are summed up into a directive injection amount of the urea water 17 to the urea water addition means 18. Thus, proper and adequate injection of the urea water 17 is attained in accordance with volume ratios of the respective temperature zones for the catalyst 10.

Thus, according to the above embodiment, proper and adequate injection of the urea water 17 can be realized in accordance with volume ratios of the respective temperature zones for the catalyst 10. As a result, $NO_x$ reduction performance of the catalyst 10 can be maximumly brought out to keep the $NO_x$ reduction ratio as high as possible by properly controlling the injection amount of the urea water 17; an amount of consumption of the urea water 17 required can be suppressed to minimum by preventing the urea water 17 from being excessively injected; and it can be preliminarily prevented that any excessive urea water 17 passes through the catalyst 10 and is discharged while it remains unreacted.

Especially in the embodiment, the temperature correction is carried out in consideration of endotherm in the cooling action through addition of the urea water 17 and exotherm due to the $NO_x$ purification reaction upon estimation of catalyst temperature for each of the cells, so that the estimation of catalyst temperature can be made with higher accuracy for each of the cells and thus directive injection amount of the urea water 17 can be controlled more accurately.

For reference, it is noted that the technique of calculating temperature parameter required for the control from temperature distribution volume ratios in the method for controlling the exhaust emission control device according to the invention may be diverted, for example, to effect forced regeneration of an oxidation-catalyst-carrying particulate filter by adding fuel upstream of the catalyst, which makes it possible to change an injection amount of fuel when a volume ratio of a region above a predetermined temperature exceeds a predetermined value in the particulate filter, or to suppress addition of fuel when a volume ratio of a high temperature region exceeds a predetermined value.

It is to be understood that a method for controlling an exhaust emission control device of the invention is not limited to the above embodiment and that various changes and modifications may be made without departing from the gist of the invention. For example, light oil or the like other than urea water may be employed as the reducing agent added to the catalyst. A predicted control for prevention of malfunction may be developed which uses the first-order lag response model for temperature estimation a several cycles after. Moreover, upon determination of the reference injection amount of the reducing agent, an amount of the reducing agent already adsorbed to the catalyst may be estimated to correct the reference injection amount.

The invention claimed is:

1. A method for controlling an exhaust emission control device with selective reduction catalyst incorporated in an exhaust pipe, a reducing agent being added upstream of the catalyst by reducing agent addition means so as to reduce and purify $NO_x$, which comprises the steps of detecting an exhaust temperature upstream of the catalyst, using a first-order lag response model corresponding to the detected temperature to estimate a temperature of each of cells into which the catalyst is minutely divided, summing up cell volumes for each of temperature zones on the basis of the estimated temperatures for the cells, dividing the cell volume summation for each of the temperature zones by a whole volume of the catalyst to determine temperature distribution volume ratio for said temperature zone, multiplying the determined temperature distribution volume ratio for each of the temperature zones by a reference injection amount of the reducing agent determined for said temperature zone in consideration of a current engine operation status on the assumption that catalyst temperatures are all within said temperature zone, and summing up the calculated values for the temperature zones into a directive injection amount of the reducing agent to the reducing agent addition means, wherein, upon estimation of catalyst temperature for each of cells, temperature correction is effected in consideration of endotherm in cooling action through addition of the reducing agent and exotherm due to $NO_x$ purification reaction.

2. A method for controlling an exhaust emission control device as claimed in claim 1, wherein an endothermic change occurs due to cooling action due to adhesion of moisture in urea water onto the catalyst, and an exothermic change occurs due to reaction of ammonia generated from urea water with $NO_x$ in the exhaust gas on the catalyst.

* * * * *